United States Patent
Akiyama et al.

(10) Patent No.: US 8,872,638 B2
(45) Date of Patent: *Oct. 28, 2014

(54) CONTROLLING COMMUNICATION AMONG MULTIPLE INDUSTRIAL CONTROL SYSTEMS

(75) Inventors: Kazuhito Akiyama, Tokyo (JP);
Michiharu Kudo, Kanagawa-ken (JP);
Hitomi Takahashi, Kanagawa-ken (JP);
Naohiko Uramoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/446,172

(22) Filed: Apr. 13, 2012

(65) Prior Publication Data

US 2012/0268256 A1 Oct. 25, 2012

(30) Foreign Application Priority Data

Apr. 19, 2011 (JP) .................................. 2011-092735

(51) Int. Cl.
*H04B 3/36* (2006.01)
*H04L 29/06* (2006.01)

(52) U.S. Cl.
CPC ............ *H04L 63/1408* (2013.01); *H01L 67/12* (2013.01)
USPC ......... 340/425.5; 340/506; 340/3.1; 709/217; 709/204; 726/11; 726/15

(58) Field of Classification Search
USPC ...................................... 340/506, 425.5, 3.1
See application file for complete search history.

(56) References Cited

U.S. PATENT DOCUMENTS

| 5,400,246 A | * | 3/1995 | Wilson et al. ................... 700/17 |
| 2007/0064689 A1 | | 3/2007 | Shin et al. |
| 2009/0077883 A1 | * | 3/2009 | Bula ................................. 47/89 |

FOREIGN PATENT DOCUMENTS

| JP | 10-242966 | 9/1998 |
| JP | 2002-006937 | 1/2002 |
| JP | 2002-157178 | 5/2002 |

OTHER PUBLICATIONS

"SCADA", [online], Wikipedia, [searched on Mar. 30, 2011], the Internet <URL: http://www.wikipedia.org/wiki/SCADA>.

* cited by examiner

*Primary Examiner* — Daryl Pope
(74) *Attorney, Agent, or Firm* — Derek S. Jennings; Patent Mining Works, LLC (57) ABSTRACT

A communication control method and system for controlling communication among multiple industrial control systems connected via a network. The communication control system includes: a communication relay apparatus for relaying communication between at least two of multiple industrial control systems; a monitoring section for monitoring the multiple industrial control systems; and a control section for switching, if the monitoring section detects an anomaly from at least one of the multiple industrial control systems, communication between an industrial control system detected with an anomaly and a second industrial control system so that the communication is performed via the communication relay apparatus.

11 Claims, 10 Drawing Sheets

CONTROLLING COMMUNICATION AMONG MULTIPLE INDUSTRIAL CONTROL SYSTEMS

CROSS-REFERENCE TO RELATED APPLICATION

This application claims priority under 35 U.S.C. §119 from Japanese Patent Application No. 2011-092735 filed Apr. 19, 2011, the entire contents of which are incorporated herein by reference.

BACKGROUND OF THE INVENTION

1. Field of the Invention

The present invention relates to a communication system. More particularly, the present invention relates to a system controlling communication among multiple industrial control systems.

2. Description of Related Art

Industrial control systems (ICS) for management and control on industrial and infrastructure systems are known (for example, see "SCADA", [online], Wikipedia, [searched on Mar. 30, 2011], the Internet <URL: http://www.wikipedia.org/wiki/SCADA>). Conventionally, a number of industrial control systems operate within their own specific protocols without being connected to an external network.

Recently, however, a general communication protocol such as the Internet protocol has been used to connect industrial control systems, and the number of such systems connected to both an intra-company system and an external network is increasing. If maliciously attacked from the outside, such industrial control systems are required to take actions to prevent the attacker from taking control over control-target equipment, where such actions can include immediate shut down of the control-target equipment.

There can be a case, however, where an industrial control system cannot shut down a control target in a short time, depending on the type of the control target, due to a technical factor or from a viewpoint of a social demand. Therefore, industrial control systems are required to take appropriate actions for each control target upon detection of anomaly due to an outside malicious attack.

SUMMARY OF THE INVENTION

Accordingly, one aspect of the present invention provides a communication control system controlling communication among multiple industrial control systems connected via a network, the communication control system including: a communication relay apparatus for relaying communication between at least two of multiple industrial control systems; a monitoring section for monitoring the multiple industrial control systems; and a control section for switching, if the monitoring section detects an anomaly from at least one of the multiple industrial control systems, communication between an industrial control system detected with an anomaly and a second industrial control system so that the communication is performed via the communication relay apparatus.

Another aspect of the present invention provides a system including: multiple industrial control systems; a network connecting the multiple industrial control systems; a communication relay apparatus relaying communication between at least two of the multiple industrial control systems; a monitoring section monitoring the multiple industrial control systems; and a control section switching, if the monitoring section detects anomaly from at least one of the multiple industrial control systems, communication between an industrial control system detected with the anomaly and a second industrial control system so that the communication is performed via the communication relay apparatus.

Another aspect of the present invention provides a communication control method for controlling communication among multiple industrial control systems connected via a network, the communication control method including the steps of: monitoring multiple industrial control systems; relaying communication between at least two of the multiple industrial control systems; and switching, if an anomaly of at least one of the multiple industrial control systems is detected, communication between an industrial control system detected with the anomaly and a second industrial control system so that the communication is performed via a communication relay apparatus, where at least one of the steps is carried out by using a computer device.

DETAILED DESCRIPTION OF THE PREFERRED EMBODIMENTS

The present invention will be described below through an embodiment of the invention. However, the embodiment below does not limit the invention according to the claims. Furthermore, all the combinations of features described in the embodiment are not necessarily required for means of the invention.

An aspect of the present invention provides a communication control system controlling communication among multiple industrial control systems connected via a network, the communication control system including: a communication relay apparatus relaying communication between two or more industrial control systems; a monitoring section monitoring the multiple industrial control systems; and a control section switching that reroutes communication channel between the industrial control system where the anomaly has been detected and another industrial control system via the communication relay apparatus in response to the monitoring section detecting anomaly of at least one of the industrial control systems. Furthermore, there are also provided a system, an apparatus and a program which are related to such a communication control system.

Figure 1:
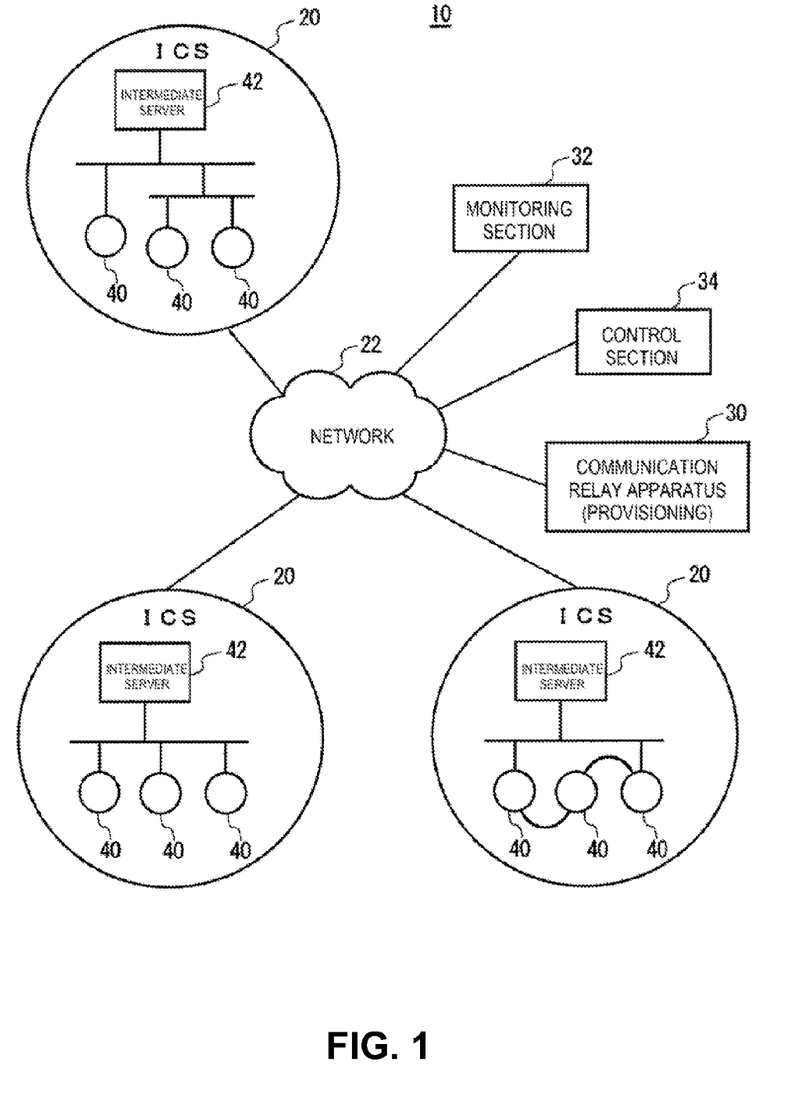
FIG. 1 shows a functional configuration of a computing system according to an embodiment of the present invention.

FIG. 1 shows a functional configuration of a computing system 10 according to the embodiment. The computing system 10 includes multiple industrial control systems (ICS) 20, a network 22, a communication relay apparatus 30, a monitoring section 32 and a control section 34.

As an example, the industrial control system 20 is a system managing and controlling each object of an industrial system, an infrastructure (for control of traffic, energy) system. As an example, the industrial control system 20 can be a system that manages various devices (for example, a telephone, a copying machine and the like), which are connected to a network in an office or at home. The industrial control system 20 can be a system managing multiple computers connected to a network in a company, or it can be a system managing a number of servers connected to a network of a data center.

Each of the multiple industrial control systems 20 can be a partial system in one larger industrial control system. For example, each of the multiple industrial control systems 20 can be a partial management system (for example, a building management system, a factory management system, a water supply management system, an electricity management system) constituting an industrial control system managing the whole city.

As an example, each of the multiple industrial control systems 20 includes multiple information processing apparatuses 40, an intermediate server 42 and the like. Each of the multiple information processing apparatuses 40 executes a program to perform data processing, apparatus control. Each of the multiple information processing apparatuses 40 can be a computer or can be a data processing unit included in equipment. As an example, each of the multiple information processing apparatuses 40 can be a PLC (Programmable Logic Controller) controlling the equipment.

As an example, the intermediate server 42 controls and manages the information processing apparatuses 40 in the industrial control system 20. As an example, the intermediate server 42 also controls communication with other industrial control systems 20 performed via the network 22.

The network 22 connects the multiple industrial control systems 20. For example, the network 22 transmits data exchanged among the multiple industrial control systems 20 with protocols used in Internet and the like.

The communication relay apparatus 30 relays communication between two or more industrial control systems 20. More specifically, when anomaly is detected in any of the industrial control systems 20, the communication relay apparatus 30 relays communication between the industrial control system 20 where the anomaly has been detected and another industrial control system 20 by rerouting the network. When no anomaly is detected in any of the industrial control systems 20, the communication relay apparatus 30 does not relay communication between two or more industrial control systems 20.

In the embodiment, the computing system 10 further includes a server apparatus which is connected to the network 22 and which deploys and executes a virtual machine. In the embodiment, the communication relay apparatus 30 is dynamically realized by the virtual machine executed by the server apparatus.

More specifically, when no anomaly is detected in any of the industrial control systems 20, the communication relay apparatus 30 realized by the virtual machine is not deployed on the network 22. However, when anomaly is detected in any of the industrial control system 20, appropriate software is loaded and configured, and the communication relay apparatus 30 is provisioned onto the network 22 as a gateway for the industrial control system 20 where the anomaly has been detected is performed. Thus, the communication relay apparatus 30 realized by the virtual machine is deployed on the network 22 when anomaly is detected in any of the industrial control systems 20.

When the industrial control system 20 where the anomaly has been detected is recovered to be normal, the communication relay apparatus 30 is de-provisioned from the network 22 with clearing configuration properly. Thus, when no anomaly is detected in any of the industrial control systems 20, execution of the communication relay apparatus 30 realized by the virtual machine is stopped and the communication relay apparatus 30 is removed from the network 22.

Provisioning of the server can be realized with a technique such as a service providing a virtual server ("IBM Smart Business cloud service", [online], on the site of IBM Corporation [searched on Mar. 28, 2011], the Internet <URL: http://www935.ibm.com/services/jp/index.wss/summary/its/k311218v05196i57>).

The monitoring section 32 monitors the multiple industrial control systems 20. More specifically, the monitoring section 32 detects whether anomaly has occurred in the multiple industrial control systems 20 included in the computing system 10.

In response to the monitoring section 32 having detected anomaly in at least one of the industrial control systems 20, the control section 34 switches communication between the industrial control system 20 where the anomaly has been detected and another industrial control system 20 so that the communication is performed via the communication relay apparatus 30. Thereby, it is possible to cause the communication relay apparatus 30 to function as a gateway for the industrial control system 20 where the anomaly has been detected.

In response to the industrial control system 20 where the anomaly has been detected having returned to a normal state, the control section 34 switches communication between the industrial control system 20 having returned to the normal state and another industrial control system 20 so that the communication is performed not via the communication relay apparatus 30. Thereby, the communication relay apparatus 30 having been functioning as a gateway for the industrial control system 20 that has returned to the normal state can be removed from the network 22.

Figure 2:
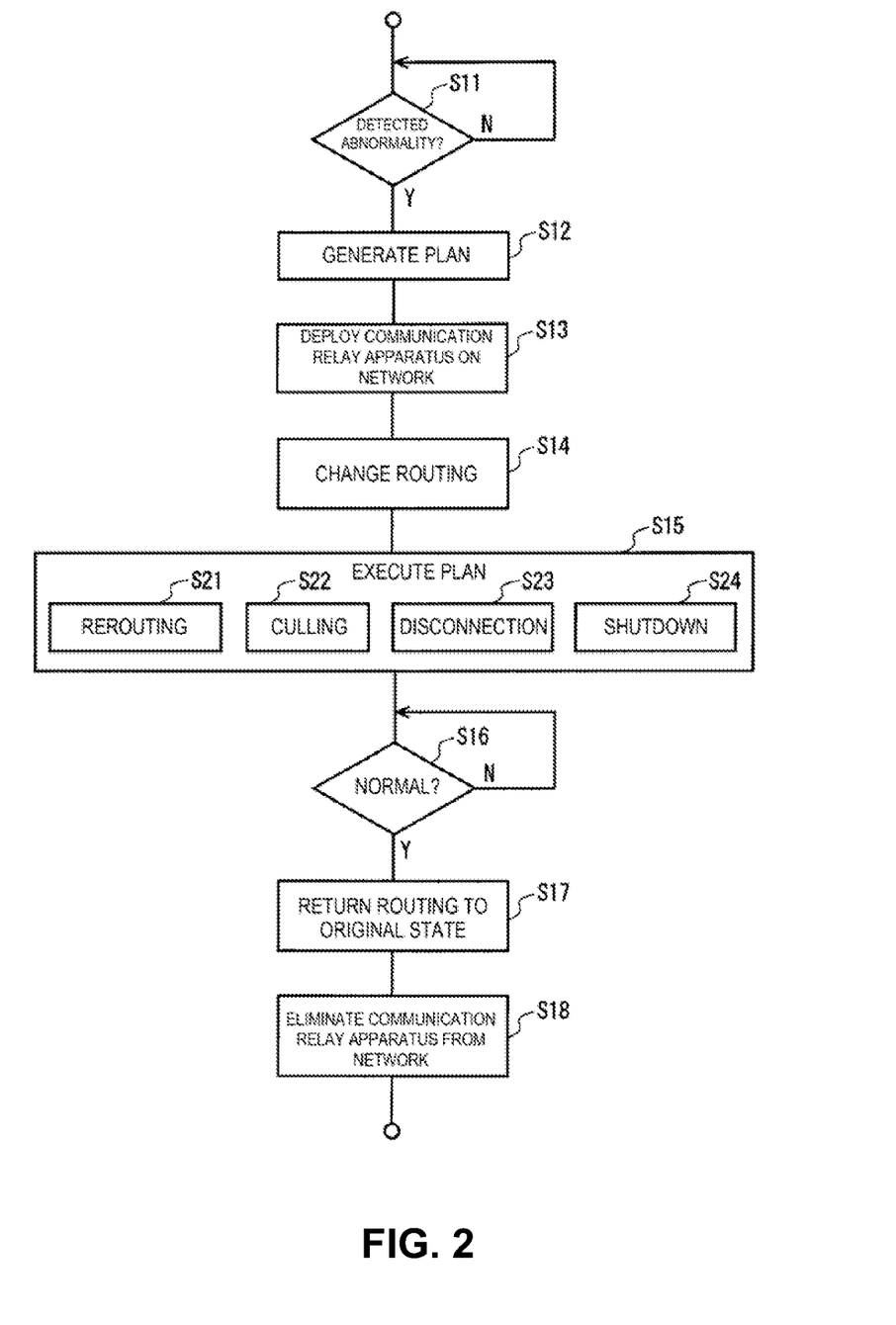
FIG. 2 shows a process flow of a control section according to the embodiment of the present invention.

FIG. 2 shows a process flow of the control section 34 according to the embodiment. First, at step S11, the control section 34 determines whether anomaly has been detected in any of the industrial control systems 20 by the monitoring section 32.

If no anomaly is detected, that is, if all the industrial control systems 20 are normal, the control section 34 waits for performing the process (S11: No). If anomaly is detected in any of the industrial control systems 20, the control section 34 advances the process to step S12 (S11: Yes).

Next, at step S12, the control section 34 generates a plan for a process of recovering the industrial control system 20 according to the details of the detected anomaly, the position of the anomaly, the level of the anomaly and the like. As an example, the control section 34 stores multiple plans in advance and selects an appropriate plan from among the multiple plans stored in advance according to the details of the detected anomaly, the position of the anomaly, the level of the anomaly and the like.

In the embodiment, the control section 34 generates a plan for executing any one of rerouting, culling, disconnection and shut-down processes or a combination of processes among these. The rerouting, culling, disconnection and shut-down processes will be described in detail later.

Next, at step S13, the control section 34 deploys the communication relay apparatus 30 on the network 22 by provisioning and causes it to function as a gateway for the industrial control system 20 where the anomaly has been detected. That is, the control section 34 loads software for causing the communication relay apparatus 30 realized by the virtual machine to function as a gateway for the industrial control system 20 and makes settings, onto and for the communication relay apparatus 30, and causes the communication relay apparatus 30 to execute the loaded software.

Next, at step S14, the control section 34 changes settings for a router and the like provided in the industrial control system 20 where the anomaly has been detected so that all packets to be transferred from the industrial control system 20 where the anomaly has been detected to another industrial control system 20 pass through the communication relay apparatus 30. As an example, the control section 34 configures the router provided in the industrial control system 20 where the anomaly has been detected so that the address of the communication relay apparatus 30 is written in the header of a packet outputted from the industrial control system 20 where the anomaly has been detected to the outside, as a relay point.

Furthermore, the control section 34 changes settings for a router and the like provided in each of the other industrial control systems 20 so that all packets to be transferred from the other industrial control systems 20 to the industrial control system 20 where the anomaly has been detected pass through via the communication relay apparatus 30. As an example, the control section 34 configures routing table settings for the router provided in each of the other industrial control systems 20 so that the communication relay apparatus 30 is set as a relay point of a packet for which the industrial control system 20 where the anomaly has been detected is specified as a destination.

Thereby, the control section 34 can cause all data inputted to and outputted from the information processing apparatuses 40 in the zone including the industrial control system 20 where the anomaly has been detected, to pass through the communication relay apparatus 30 deployed on the network 22. That is, the control section 34 can generate a network zone including the industrial control system 20 where the anomaly has been detected and having the communication relay apparatus 30 as a gateway.

Next, at step S15, the control section 34 causes the communication relay apparatus 30 to execute the plan generated at step S12. In the embodiment, the control section 34 causes the communication relay apparatus 30 to execute any one of rerouting (S21), culling (S22), disconnection (S23) and shut-down (S24), or a combination thereof.

Furthermore, the control section 34 can execute another process of recovering the industrial control system 20 where the anomaly has been detected to the normal state while the plan is being executed at step S15. For example, if the cause of the anomaly is unauthorized software (malware), the control section 34 executes a process of detecting and excluding the malware. For example, if the cause of the anomaly is a fault of equipment, the control section 34 can notify an administrator of the fault and wait for the fault equipment being repaired or replaced.

Next, at step S16, the control section 34 determines whether the detected anomaly has been eliminated and the normal state has been restored. If the anomaly has not been eliminated (S16: No), the control section 34 continues execution of the plan of step S15.

If the normal state has been restored (S16: Yes), the control section 34 returns the routing of data changed at step S14 to the original state, at step S17. More specifically, the control section 34 returns the settings for the router and the like provided in the industrial control system 20 where the anomaly has been detected so that packets to be transferred from the industrial control system 20 where the anomaly has been detected to another industrial control system 20 do not pass through the communication relay apparatus 30. Furthermore, the control section 34 returns the settings for the router and the like provided in each of the other industrial control systems 20 to the original state so that packets to be transferred from the other industrial control systems 20 to the industrial control system 20 where the anomaly has been detected do not pass through the communication relay apparatus 30.

Next, at step S18, the control section 34 removes the communication relay apparatus 30 deployed on the network 22 from the network 22. That is, the control section 34 stops execution of the communication relay apparatus 30 realized by the virtual machine and releases the setting of the communication relay apparatus 30 so that the communication relay apparatus 30 does not exist on the network 22.

According to such a computing system 10, it is possible to dynamically deployed the communication relay apparatus 30 between the industrial control system 20 where anomaly has been detected and another industrial control system 20 to separate them as being in different networks. Thereby, according to the computing system 10, it is possible to recover an industrial control system 20 where anomaly has been detected, in an appropriate procedure while reducing influence on the industrial control systems 20 other than the industrial control system 20 where the anomaly has been detected.

Figure 3:
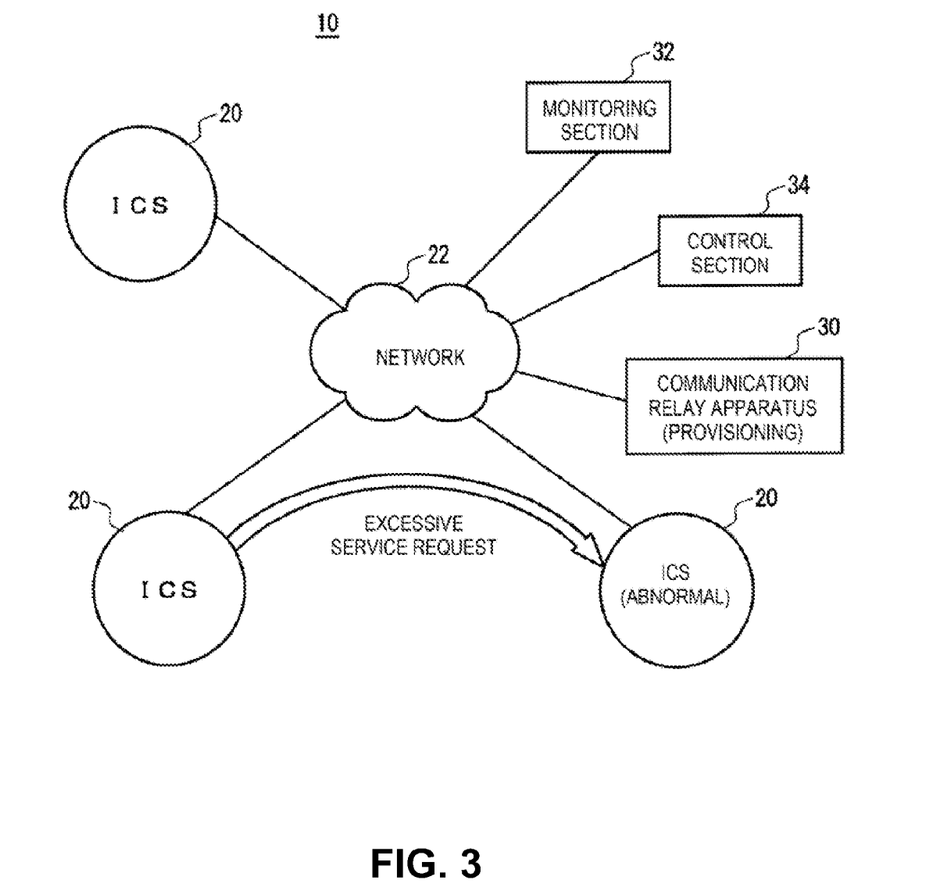
FIG. 3 shows a functional configuration of the computing system in a state where anomaly has occurred in a part of industrial control systems.

FIG. 3 shows a functional configuration of the computing system 10 in a state where anomaly has occurred in a part of the industrial control systems 20. As an example, the monitoring section 32 detects, as anomaly, that the amount of the flow of data inputted to and outputted from an industrial control system 20 has increased to or above a value determined in advance. More specifically, for example, if certain one industrial control system 20 receives excessive service requests which are not completed from another industrial control system 20, the monitoring section 32 detects that the one industrial control system 20 which has received the excessive service requests is abnormal since some processing components are broken. On the contrary, the monitoring section 32 can detect that the industrial control system 20 issuing the excessive service request is abnormal since someone attacks it As an example, when the response speed of certain one industrial control system 20 significantly decreases or when the temperature of a server increases, the monitoring section 32 can detect that the industrial control system 20 is abnormal. As an example, when malware exists in an industrial control system 20, the monitoring section 32 can detect it as anomaly. Upon detecting such anomaly, the monitoring section 32 notifies the control section 34 of having detected the anomaly and of the details of the anomaly and the like.

Figure 4:
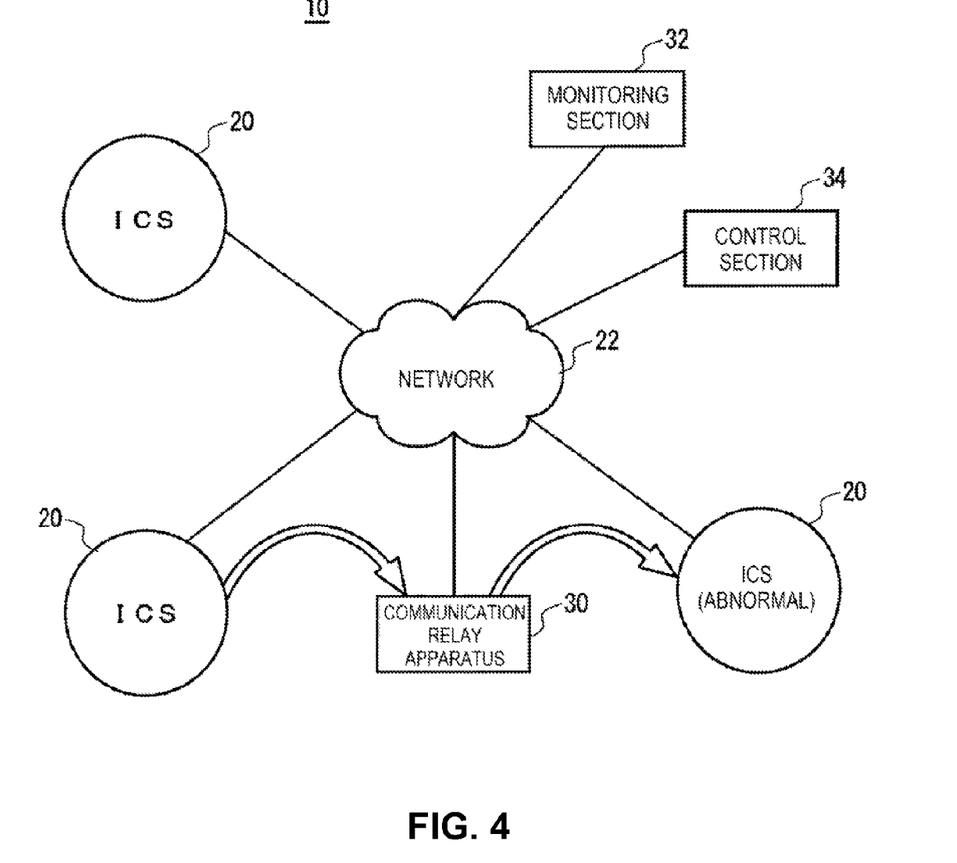
FIG. 4 shows a functional configuration of the computing system in a state where a communication relay apparatus is deployed in a network.

FIG. 4 shows a functional configuration of the computing system 10 in a state where the communication relay apparatus 30 is deployed in the network 22. When anomaly is detected in any of the industrial control systems 20, provisioning of the communication relay apparatus 30 to a specified address on the network 22 is performed under the control of the control section 34. Then, the communication relay apparatus 30 functions as a gateway for the industrial control system 20 where the anomaly has been detected.

That is, the communication relay apparatus 30 once acquires data outputted from another industrial control system 20 and transfers the acquired data to the industrial control system 20 where the anomaly has been detected. The communication relay apparatus 30 also once acquires data outputted from the industrial control system 20 where the anomaly has been detected and transfers the acquired data to another industrial control system 20. Therefore, when an excessive service request is issued from another industrial control system 20 to the industrial control system 20 where the anomaly has been detected, the communication relay apparatus 30 can detect and relay the excessive service request from the other industrial control system 20 to transfer it to the industrial control system 20 where the anomaly has been detected.

Figure 5:
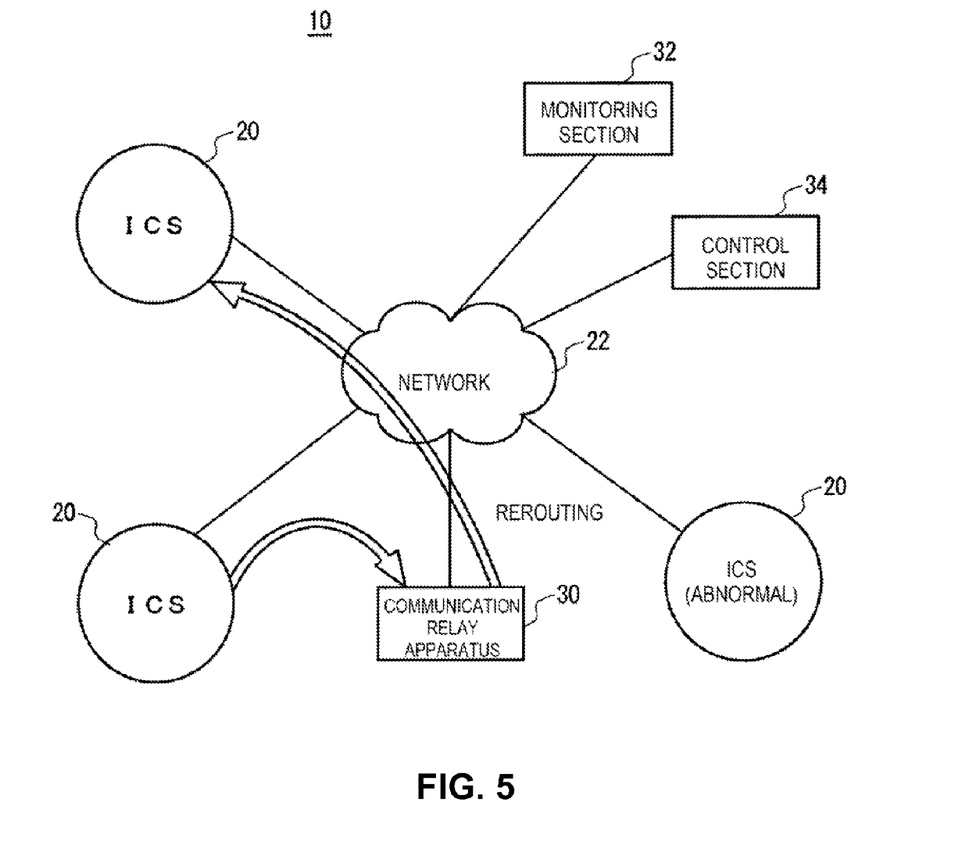
FIG. 5 shows a functional configuration of the computing system in a state where the communication relay apparatus reroutes communication.

FIG. 5 shows a functional configuration of the computing system 10 in a state where the communication relay apparatus 30 reroutes communication. As an example, when anomaly is detected in an industrial control system 20, the control section 34 causes the communication relay apparatus 30 to execute rerouting. In the execution of rerouting, the communication relay apparatus 30 performs routing of service requests from another industrial control system 20 to an alternative industrial control system 20 which accepts the service requests among the multiple industrial control systems 20.

As an example, the communication relay apparatus 30, in this case, transfers service requests or data given to the industrial control system 20 where the anomaly has been detected, from another industrial control system 20, to still another industrial control system 20 which provides a service similar to that of the industrial control system 20 where the anomaly has been detected. As an example, in this case, if a number of service requests or data are given to the industrial control system 20 where the anomaly has been detected, from one particular industrial control system 20, the communication relay apparatus 30 can select either the service requests or data issued from the one particular industrial control system 20, among all service requests and data given to the industrial control system 20 where the anomaly has been detected, and transfer them to the alternative industrial control system 20.

Thereby, the control section 34 can reduce the processing load on the industrial control system 20 where the anomaly has been detected. The control section 34 can return the operation of the industrial control system 20 where the anomaly has been detected, to the normal state.

Figure 6:
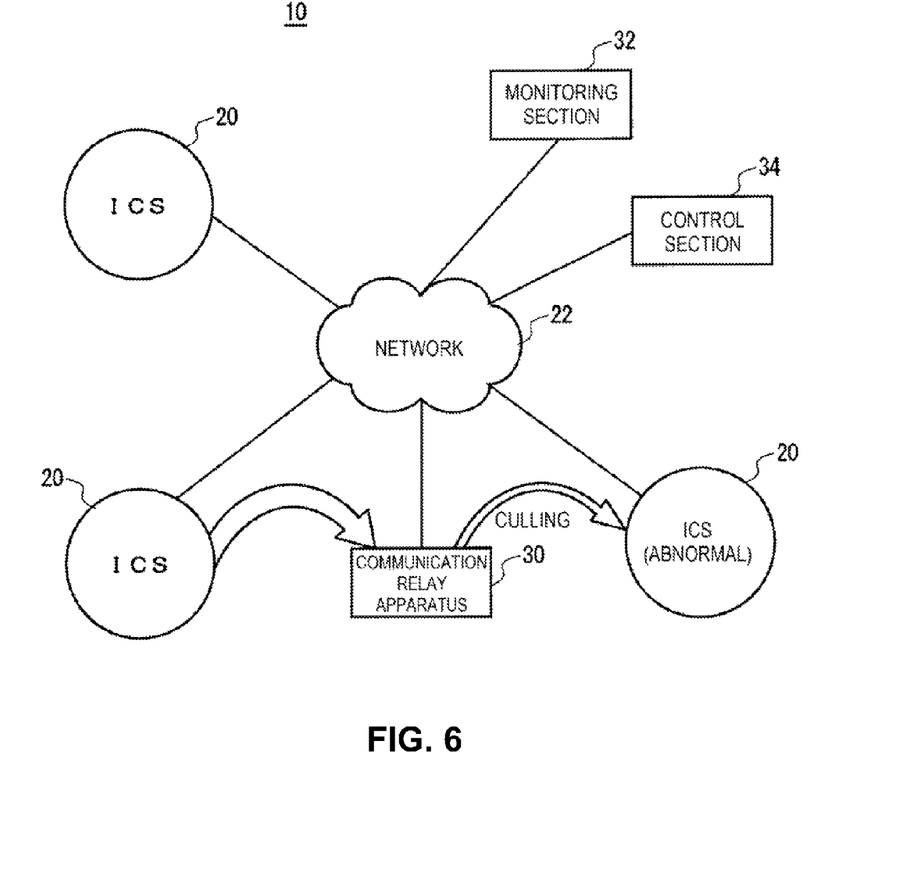
FIG. 6 shows a functional configuration of the computing system in a state where the communication relay apparatus culls out communication.

FIG. 6 shows a functional configuration of the computing system 10 in a state where the communication relay apparatus 30 culls out communication. As an example, when anomaly is detected in an industrial control system 20, the control section 34 causes the communication relay apparatus 30 to execute culling. In the execution of culling, the communication relay apparatus 30 restricts communication between the industrial control system 20 where the anomaly has been detected and another industrial control system 20.

More specifically, the communication relay apparatus 30 culls out service requests and/or data from another industrial control system 20 to the industrial control system 20 where the anomaly has been detected. As an example, in this case, if a number of service requests and data are given from one particular industrial control system 20 to the industrial control system 20 where the anomaly has been detected, the communication relay apparatus 30 can select either the service requests or data issued from the one particular industrial control system 20, among all service requests and data given to the industrial control system 20 where the anomaly has been detected, and culls out those requests or data.

Thereby, the control section 34 can reduce the processing load on the industrial control system 20 where the anomaly has been detected. The control section 34 can return the operation of the industrial control system 20 where the anomaly has been detected, to the normal state.

As an example, the communication relay apparatus 30 can cull out at least either opposite-direction service requests or data. That is, the communication relay apparatus 30 can cull out at least either service requests or data from the industrial control system 20 where the anomaly has been detected to another industrial control system 20. Thereby, the control section 34 can reduce the processing load on the industrial control system 20 to which the service requests or data are given from the industrial control system 20 where the anomaly has been detected. Then, the control section 34 can return the operation of the industrial control system 20 to which the service requests or data are given from the industrial control system 20 where the anomaly has been detected, to the normal state.

Figure 7:
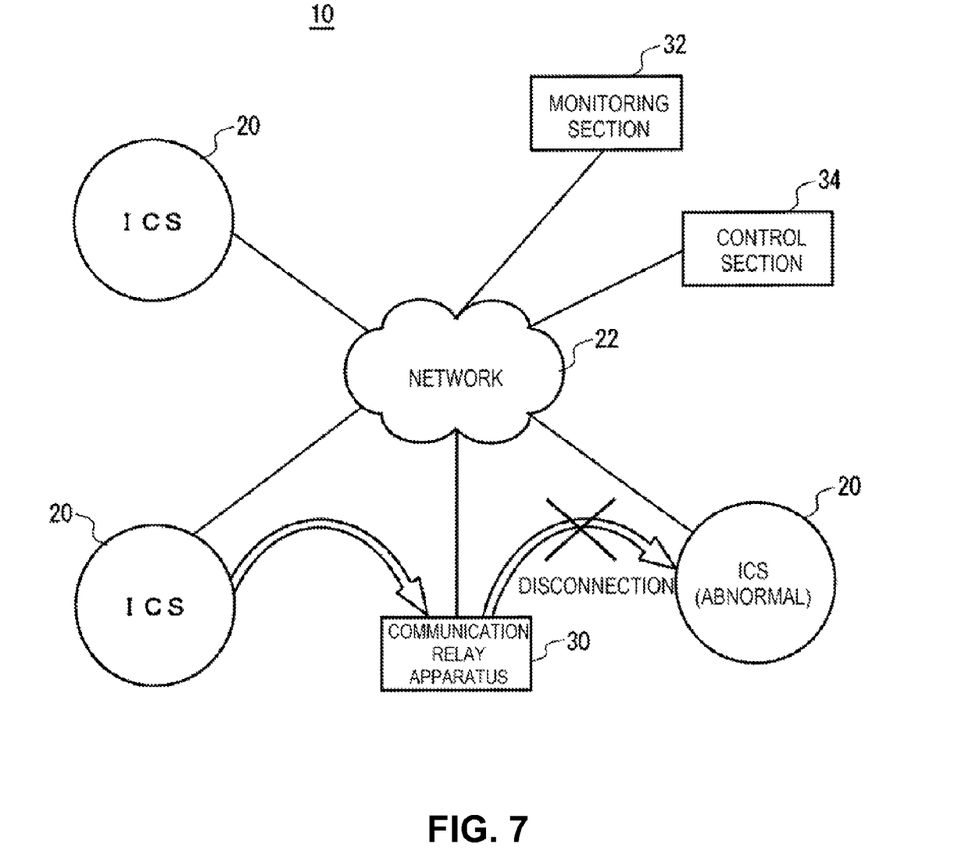
FIG. 7 shows a functional configuration of the computing system in a state where the communication relay apparatus disconnects communication.

FIG. 7 shows a functional configuration of the computing system 10 in a state where the communication relay apparatus 30 disconnects communication. As an example, when anomaly is detected in an industrial control system 20, the control section 34 causes the communication relay apparatus 30 to execute disconnection. In the execution of disconnection, the communication relay apparatus 30 cuts off communication between the industrial control system 20 where the anomaly has been detected and another industrial control system 20.

As an example, in this case, the communication relay apparatus 30 discards service requests or data given to the industrial control system 20 where the anomaly has been detected, from another industrial control system 20 without transferring the service requests or data to the industrial control system 20 where the anomaly has been detected. As an example, if a number of service requests or data are given from one particular industrial control system 20 to the industrial control system 20 where the anomaly has been detected, the communication relay apparatus 30 can select either the service requests or data issued from the one particular industrial control system 20, among all service requests and data given to the industrial control system 20 where the anomaly has been detected, and discard them. As an example, in this case, the communication relay apparatus 30 can notify that the service requests have been discarded, with the use of a mechanism existing in the system.

Thereby, the control section 34 can reduce the processing load on the industrial control system 20 where the anomaly has been detected. The control section 34 can return the operation of the industrial control system 20 where the anomaly has been detected, to the normal state.

As an example, the communication relay apparatus 30 can discard at least either opposite-direction service requests or data without transferring them. That is, as an example, the communication relay apparatus 30 can discard at least either service requests or data from the industrial control system 20 where the anomaly has been detected to another industrial control system 20. Thereby, the control section 34 can reduce the processing load on the industrial control system 20 to which the service requests or data are given from the industrial control system 20 where the anomaly has been detected. Then, the control section 34 can return the operation of the industrial control system 20 to which the service requests or data are given from the industrial control system 20 where the anomaly has been detected, to the normal state.

Figure 8:
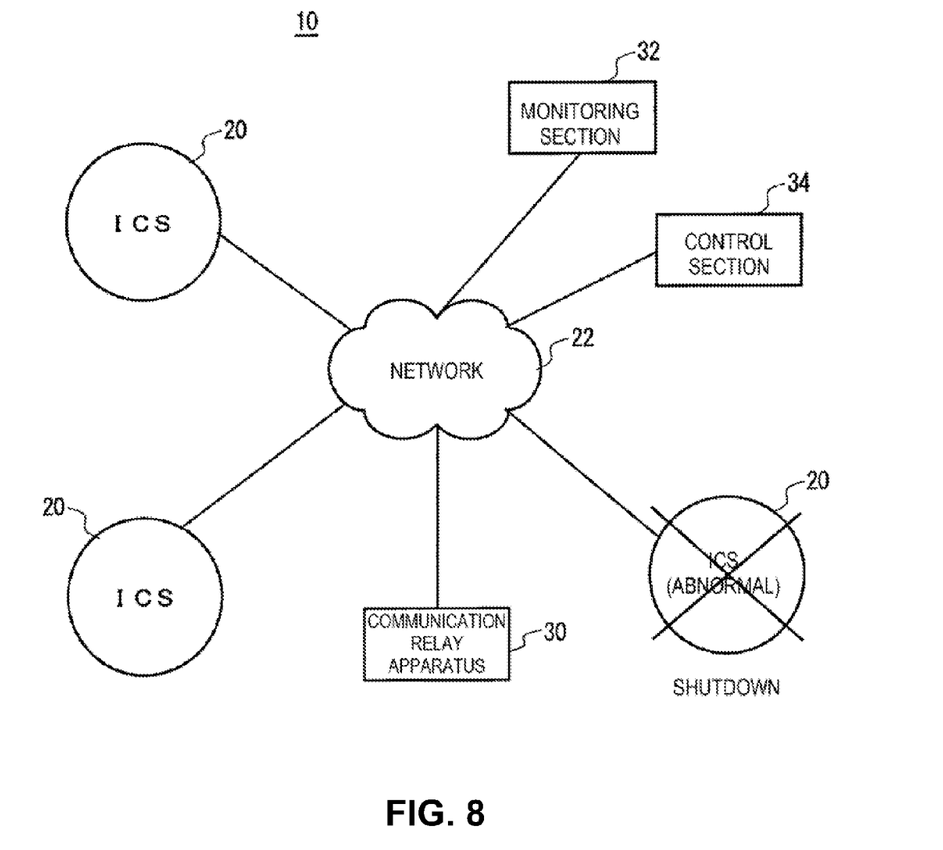
FIG. 8 shows a functional configuration of the computing system in a state where the industrial control system having the anomaly is shut down.

FIG. 8 shows a functional configuration of the computing system 10 in a state where the industrial control system 20 having anomaly is shut down. As an example, when anomaly is detected in an industrial control system 20, the control section 34 shuts down the industrial control system 20 where the anomaly has been detected.

That is, the communication relay apparatus 30 stops the whole operation of the industrial control system 20 where the anomaly has been detected. Then, after the shutdown, the communication relay apparatus 30 reboots the industrial control system 20 where the anomaly has detected to start the operation. Thereby, the control section 34 can return the operation of the industrial control system 20 where the anomaly has been detected, to the normal state.

Figure 9:
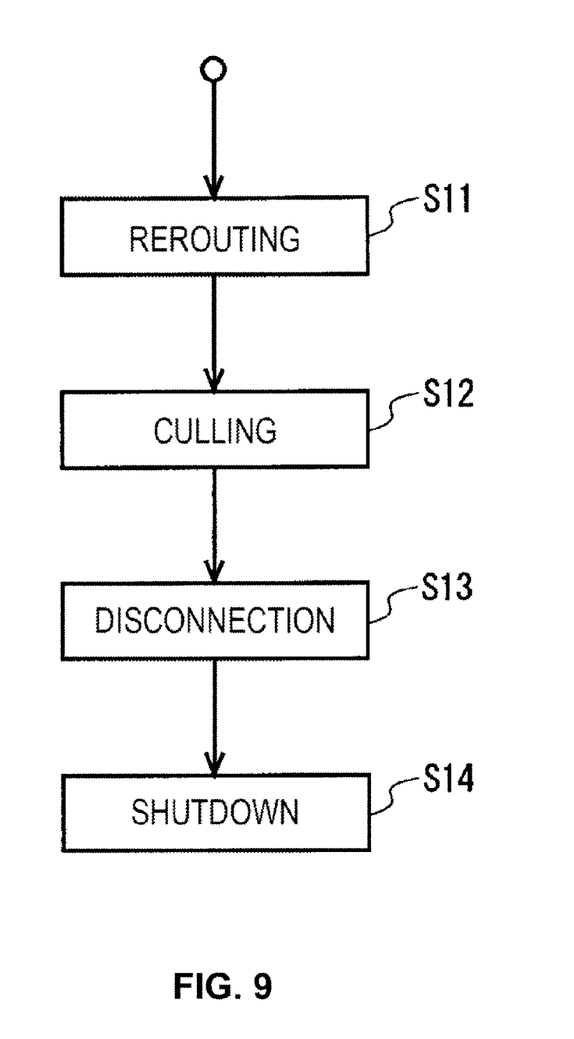
FIG. 9 shows an example of executing a plan for recovering the industrial control system where the anomaly has been detected to a normal state by incrementing action levels.

FIG. 9 shows an example of executing a plan for recovering the industrial control system 20 where the anomaly has been detected to the normal state by incrementing action levels. In the embodiment, for a process of recovering an industrial control system 20 where anomaly has occurred, an action level is set according to the degree of influence the process has on the whole system, and the like.

For example, for a process having a low probability of being able to recover the industrial control system 20 to the normal state but having little influence on the system when it is executed, a lower action level is set. For example, for a process having a high probability of being able to recover the industrial control system 20 to the normal state but having much influence on the system when it is executed, a higher action level is set. For example, in the embodiment, the lowest action level is set for rerouting, the second lowest action level is set for culling, the third lowest action level is set for disconnection, and the highest action level is set for shutdown.

The control section 34 further determines an action level for the industrial control system 20 where the anomaly has been detected, on the basis of a result of monitoring by the monitoring section 32. As an example, the control section 34 determines the action level according to the details of detected anomaly and the degree of significance. Then, the control section 34 causes the communication relay apparatus 30 to execute a process corresponding to the determined action level. Depending on the type of an industrial control system 20, for example, in the case of an industrial control system 20 related to a social infrastructure, there can be a case where it is not possible to immediately execute a process with a high action level even if some fault occurs. In such a case, the control section 34 selects an action level so as to perform recovery while causing the system to be operating at the minimum level.

The control section 34 can execute a process with a low action level first and, if the industrial control system 20 is not recovered to the normal state, execute processes by gradually increasing the action level. For example, when anomaly is detected in any of the industrial control systems 20, the control section 34 causes the communication relay apparatus 30 to execute rerouting first (step S11). In rerouting, an industrial control system 20 where no anomaly has been detected performs a service to be processed by the industrial control system 20 where the anomaly has been detected, as a proxy. Therefore, rerouting has little influence on the system.

Next, if the industrial control system 20 is not recovered to the normal state even by the execution of rerouting, the control section 34 causes the communication relay apparatus 30 to execute culling (step S12). In culling, a part of services and data are discarded. Therefore, culling has more influence on the system than rerouting, but the amount of communication decreases. Therefore, the probability of the industrial control system 20 recovering to the normal state is higher than rerouting.

Next, if the industrial control system 20 is not recovered to the normal state even by the execution of culling, the control section 34 causes the communication relay apparatus 30 to execute disconnection (step S13). In disconnection, all of services and data are discarded. Therefore, disconnection has more influence on the system than culling, but the amount of communication in the whole system decreases more than in the case of culling. Therefore, the probability of the industrial control system 20 recovering to the normal state is higher than culling.

Next, if the industrial control system 20 is not recovered to the normal state even by the execution of disconnection, the control section 34 shuts down the industrial control system 20 (step S14). Shutdown has a great influence on the system because much time is required before reboot and equipment control becomes impossible during rebooting. However, since the abnormal industrial control system 20 is rebooted, the probability of recovery to the normal state is very high.

As described above by sequentially changing the process plan according to the action level, the control section 34 can incrementally execute plans beginning with a plan having less influence on the operation of the computing system 10. Therefore, the communication relay apparatus 30 can execute a recovery plan with an appropriate level corresponding to occurred anomaly, without executing an unnecessary recovery plan for anomaly with a low degree of significance.

Figure 10:
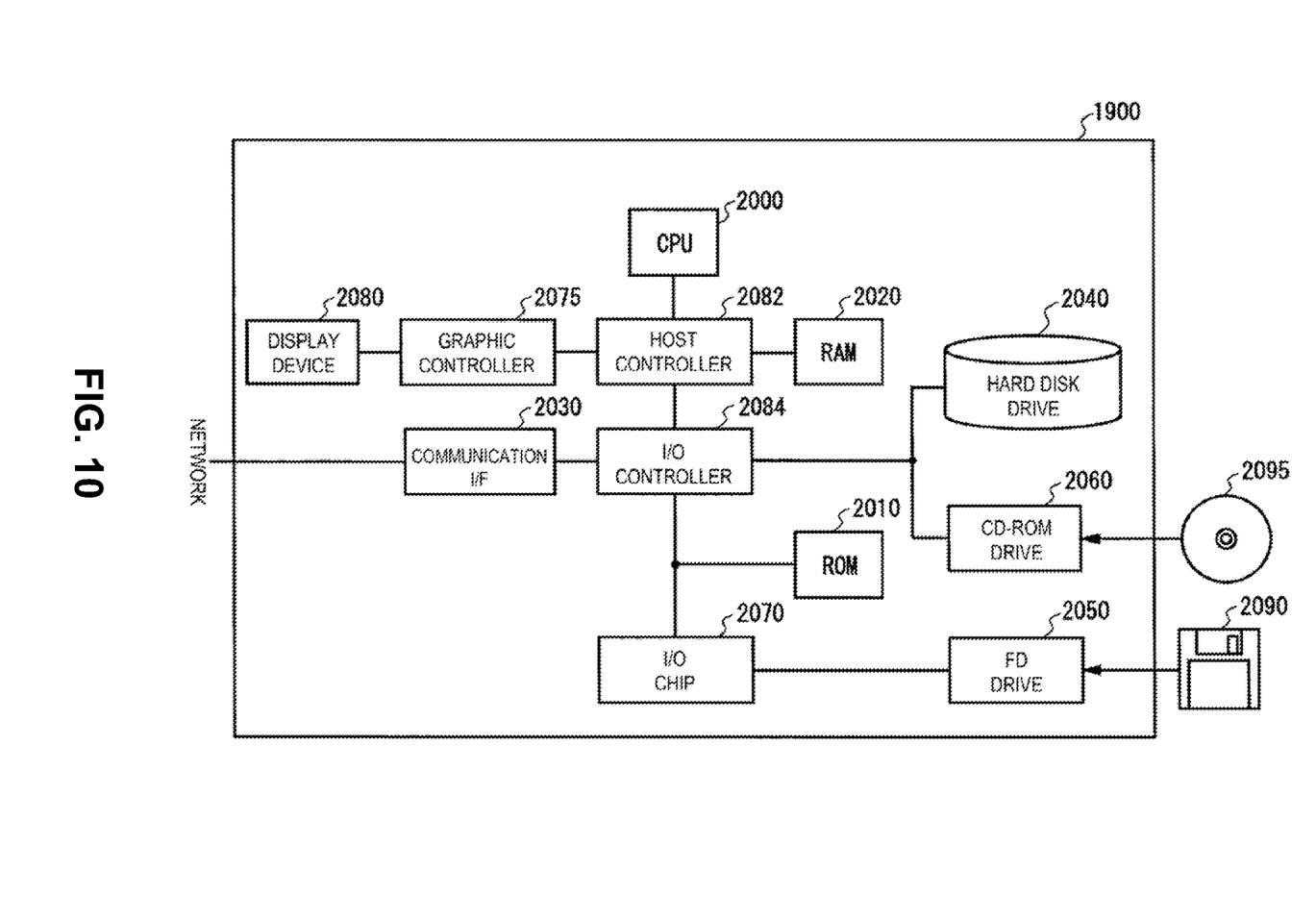
FIG. 10 shows an example of a hardware configuration of a computer according to the embodiment.

FIG. 10 shows an example of a hardware configuration of a computer 1900 according to the embodiment. The computer 1900 according to the embodiment includes a CPU peripheral part having a CPU 2000, a RAM 2020, a graphic controller 2075 and a display device 2080 which are mutually connected via a host controller 2082, an input/output part having a communication interface 2030, a hard disk drive 2040 and a CD-ROM drive 2060 which are connected to the host controller 2082 via an input/output controller 2084, and a legacy input/output part having a ROM 2010, a flexible disk drive 2050 and an input/output chip 2070 which are connected to the input/output controller 2084.

The host controller 2082 connects the RAM 2020 to the CPU 2000 and the graphic controller 2075 which access the RAM 2020 at a high transfer rate. The CPU 2000 operates on the basis of programs stored in the ROM 2010 and the RAM 2020 and controls each section. The graphic controller 2075 acquires image data which the CPU 2000 and the like generate on a frame buffer provided in the RAM 2020 and displays it on the display device 2080. Alternatively, the graphic controller 2075 can include a frame buffer storing image data generated by the CPU 2000 and the like therein.

The input/output controller 2084 connects the host controller 2082 to the communication interface 2030, the hard disk drive 2040 and the CD-ROM drive 2060 which are relatively high-speed input/output devices. The communication interface 2030 communicates with other apparatuses via a network. The hard disk drive 2040 stores programs and data used by the CPU 2000 in the computer 1900. The CD-ROM drive 2060 reads a program or data from a CD-ROM 2095 and provides it for the hard disk drive 2040 via the RAM 2020.

To the input/output controller 2084, the ROM 2010, the flexible disk drive 2050 and the input/output chip 2070, which are relatively low-speed input/output devices, are connected. The ROM 2010 stores a boot program executed when the computer 1900 is booted up and/or programs and the like dependent on the hardware of the computer 1900. The flexible disk drive 2050 reads a program or data from a flexible disk 2090 and provides it for the hard disk drive 2040 via the RAM 2020. The input/output chip 2070 connects the flexible disk drive 2050 to the input/output controller 2084 and connects various input/output devices to the input/output controller 2084, for example, via a parallel port, a serial port, a keyboard port, a mouse port and the like.

The programs provided for the hard disk drive 2040 via the RAM 2020 are stored in recording media such as the flexible disk 2090, the CD-ROM 2095 and an IC card, and provided by a user. The programs are read from the recording media, installed in the hard disk drive 2040 in the computer 1900 via the RAM 2020 and executed by the CPU 2000.

The programs which are installed in the computer 1900 and cause the computer 1900 to function as the computing system 10 include a monitoring module, a control module and a communication relay module. These programs or the modules work the CPU 2000 and the like to cause the computer 1900 to function as the computing system 10.

Information processing described in these programs functions as the monitoring section 32, the control section 34 and the communication relay apparatus 30, which are concrete means realized by cooperation by software and the various hardware resources described above, by being read into the computer 1900. By realizing operation and processing of information in accordance with the intended use of the computer 1900 in the embodiment by these concrete means, a unique computing system 10 in accordance with the intended use is constructed.

As an example, in the case of performing communication between the computer 1900 and an external apparatus, the CPU 2000 executes a communication program loaded on the RAM 2020, and instructs the communication interface 2030 to perform a communication process on the basis of the contents of the process described in the communication program. Under the control of the CPU 2000, the communication interface 2030 reads data to be transmitted, which is stored in a transmit buffer area provided in a storage device such as the RAM 2020, the hard disk drive 2040, the flexible disk 2090 and the CD-ROM 2095 and transmits the data to the network, or writes received data received from the network into a receive buffer area provided in the storage device. As described above, the communication interface 2030 can transfer transmitted and received data to and from a storage device in a DMA (direct memory access) method. Alternatively, the CPU 2000 can transfer transmitted and received data by reading data from a transfer source storage device or communication interface 2030 and writing data into a transfer destination communication interface 2030 or storage device.

The CPU 2000 also causes all or a necessary part of files, databases and the like stored in an external storage device, such as the hard disk drive 2040, the CD-ROM drive 2060 (the CD-ROM 2095) and the flexible disk drive 2050 (the flexible disk 2090), to be read into the RAM 2020 by DMA transfer, and performs various processes of the data on the RAM 2020. Then, the CPU 2000 writes the processed data back to the external storage device by the DMA transfer. Since the RAM 2020 can be regarded as temporarily holding the contents of the external storage device in such a process, the RAM 2020 and the external storage devices and the like are generically called a memory, a storage section, or a storage device and the like in the embodiment. Various information, which can include various programs, data, tables and databases in the embodiment, is stored in such a storage device and targeted by information process. The CPU 2000 can also hold a part of the RAM 2020 in a cache memory and perform reading and writing on the cache memory. In such a form, since the cache memory is responsible for a part of the function of the RAM 2020, it is assumed, in the embodiment, that the cache memory is also included in the RAM 2020, memory and/or storage device unless it is shown being distinguished.

The CPU 2000 also performs various processes, including the various operations, processing of information, condition judgment, information search/substitution and the like described in the embodiment, specified by a string of instructions in a program for data read from the RAM 2020 and writes the data back to the RAM 2020. For example, in the case of performing condition judgment, the CPU 2000 determines whether each of the various variables shown in the embodiment satisfies a condition that it should be larger than, smaller than, equal to or larger than, equal to or smaller than, or equal to another variable or constant and, if the condition is satisfied (or is not satisfied), branches the flow to a different string of instructions or calls a subroutine.

The CPU 2000 can search for information stored in a file, a database in a storage device. For example, when multiple entries in which the attribute value of a second attribute is associated with the attribute value of a first attribute are stored in a storage device, the CPU 2000 can obtain the attribute value of a second attribute associated with a first attribute satisfying a predetermined condition, by searching for such an entry that the attribute value of its first attribute satisfies the specified condition, among the multiple entries stored in the storage device and reading the attribute value of the second attribute stored in the entry.

The programs or modules shown above can be stored in an external recording medium. As the recording medium, an optical recording medium such as a DVD and a CD, a magneto-optical recording medium such as an MO, a tape medium, a semiconductor memory such as an IC card, and the like can be used, in addition to the flexible disk 2090 and the CD-ROM 2095. A storage device such as a hard disk and a RAM provided in a server system connected to a dedicated communication network or the Internet can be used as the recording medium to provide the programs for the computer 1900 via the network.

The present invention has been described through an embodiment. However, the technical scope of the present invention is not limited to the scope described in the above embodiment. It is apparent to one skilled in the art that various modifications and improvements can be made in the above embodiment. It is apparent from the description of the claims that such modified or improved embodiments also can be included in the technical scope of the present invention.

It should be noted that the order of execution of each process of operations, procedures, steps and stages in the devices, systems, programs and methods shown in the claims, the specification and the drawings is not expressly specified with the use of "before", "prior to" and the like, and that the process can be realized in an arbitrary order unless output of previous process is used for subsequent process. Even if an operation flow in the claims, the specification and the drawings is described with the use of "first", "next" for convenience, it does not mean that the operation flow is required to be in that order.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A communication control system controlling communication among multiple industrial control systems connected via a network, the communication control system comprising:
   a communication relay apparatus for relaying communication between at least two of multiple industrial control systems;
   a monitoring section for monitoring said multiple industrial control systems; and
   a control section for switching, if said monitoring section detects an anomaly from at least one of said multiple industrial control systems, communication between an industrial control system detected with an anomaly and a second industrial control system so that said communication is performed via said communication relay apparatus.

2. The communication control system according to claim 1, wherein said communication relay apparatus restricts said communication between said industrial control system detected with said anomaly and said second industrial control system.

3. The communication control system according to claim 2, wherein said communication relay apparatus culls out, among all of service requests and data that were given to said industrial control system detected with said anomaly, service requests and/or said data that were issued from said second industrial control system.

4. The communication control system according to claim 2, wherein said control section performs routing of said service requests from said second industrial control system to an alternative industrial control system that accepts said service requests from said multiple industrial control systems.

5. The communication control system according to claim 2, wherein:
   said control section further determines an action level of said industrial control system detected with said anomaly by using a result from said monitoring section; and
   said communication relay apparatus terminates communication between said industrial control system detected with said anomaly and said second industrial control system according to said action level.

6. The communication control system according to claim 5, wherein said control section shuts down said industrial control system detected with said anomaly according to said action level.

7. The communication control system according to claim 1, further comprising a server apparatus connected to said network and executing a virtual machine,
   wherein said control section assigns said virtual machine executed on said server apparatus as said communication relay apparatus, if said anomaly of at least one of said multiple industrial control systems is detected.

8. The communication control system according to claim 1, wherein said control section generates a network zone including said industrial control system detected with said anomaly, wherein said communication relay apparatus is provisioned as a gateway.

9. The communication control system according to claim 1, wherein, if said industrial control system detected with said anomaly returns to a normal state, said control section switches communication between an industrial control system having returned to said normal state and said second industrial control system so that said communication ceases to perform via said communication relay apparatus.

10. An apparatus functioning as said control section in said communication control system according to claim 1.

11. A system comprising:
   multiple industrial control systems;
   a network connecting said multiple industrial control systems;
   a communication relay apparatus relaying communication between at least two of said multiple industrial control systems;
   a monitoring section monitoring said multiple industrial control systems; and
   a control section switching, if said monitoring section detects anomaly from at least one of said multiple industrial control systems, communication between an industrial control system detected with said anomaly and a second industrial control system so that said communication is performed via said communication relay apparatus.

* * * * *